United States Patent
Bonanno et al.

(10) Patent No.: US 9,442,726 B1
(45) Date of Patent: Sep. 13, 2016

(54) PERCEPTRON BRANCH PREDICTOR WITH VIRTUALIZED WEIGHTS

(71) Applicant: International Business Machines Corporation, Armonk, NY (US)

(72) Inventors: James J. Bonanno, Wappingers Falls, NY (US); Michael J. Cadigan, Jr., Poughkeepsie, NY (US); Adam B. Collura, Hopewell Junction, NY (US); Matthias D. Heizmann, Poughkeepsie, NY (US); Daniel Lipetz, Flushing, NY (US); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/969,391

(22) Filed: Dec. 15, 2015

(51) Int. Cl.
*G06F 9/38* (2006.01)
*G06F 9/30* (2006.01)

(52) U.S. Cl.
CPC ......... *G06F 9/30058* (2013.01); *G06F 9/3001* (2013.01); *G06F 9/30181* (2013.01); *G06F 9/3806* (2013.01); *G06F 9/3844* (2013.01)

(58) Field of Classification Search
None
See application file for complete search history.

(56) References Cited

U.S. PATENT DOCUMENTS

| | | | |
|---|---|---|---|
| 5,574,871 A | 11/1996 | Hoyt et al. | |
| 7,082,520 B2 | 7/2006 | Bonanno et al. | |
| 7,673,122 B1 | 3/2010 | Song et al. | |
| 8,473,727 B2 | 6/2013 | Dunn et al. | |
| 8,788,797 B2 | 7/2014 | Krishnamurthy et al. | |
| 8,904,156 B2 | 12/2014 | Shah et al. | |
| 9,086,890 B2 | 7/2015 | Olson et al. | |
| 2001/0056531 A1* | 12/2001 | McFarling | G06F 9/3848 712/239 |
| 2010/0332812 A1 | 12/2010 | Burger et al. | |
| 2011/0087866 A1* | 4/2011 | Shah | G06F 9/383 712/239 |
| 2012/0117327 A1 | 5/2012 | Venkumahanti et al. | |
| 2014/0075166 A1 | 3/2014 | Haskins, Jr. | |
| 2014/0089647 A1 | 3/2014 | Kountanis et al. | |
| 2014/0201507 A1 | 7/2014 | Jayaseelan et al. | |
| 2015/0046691 A1 | 2/2015 | Heil et al. | |
| 2015/0121050 A1 | 4/2015 | Williams et al. | |
| 2016/0034279 A1 | 2/2016 | Bonanno et al. | |

OTHER PUBLICATIONS

D. Jimenez, et al., "An Optimized Scaled Neural Branch Predictor," ICCD Oct. 2011, 6 pages.

(Continued)

*Primary Examiner* — John Lindlof
(74) *Attorney, Agent, or Firm* — Cantor Colburn LLP; Margaret McNamara

(57) ABSTRACT

According to an aspect, virtualized weight perceptron branch prediction is provided in a processing system. A selection is performed between two or more history values at different positions of a history vector based on a virtualization map value that maps a first selected history value to a first weight of a plurality of weights, where a number of history values in the history vector is greater than a number of the weights. The first selected history value is applied to the first weight in a perceptron branch predictor to determine a first modified virtualized weight. The first modified virtualized weight is summed with a plurality of modified virtualized weights to produce a prediction direction. The prediction direction is output as a branch predictor result to control instruction fetching in a processor of the processing system.

11 Claims, 9 Drawing Sheets

(56) References Cited

OTHER PUBLICATIONS

D. Jimenez, et al., "Dynamic Branch Prediction with Perceptrons," The Seventh International Symposium on High-Performance Computer Architecture, Jan. 2001, 10 pages.

Ho et al., "Combining Local and Global History Hashing in Perception Branch Prediction," Computer and Information Science (ICIS), 2007 6th IEEE International Conference On, Jul. 11-13, 2007, pp. 54-59.

K. Aasaraai, et al. "A PowerAware Alternative for the Perceptron Branch Predictor," In L Choi, Y. Paek, and S. Cho, editors, Advances in Computer Systems Architecture, vol. 4697, pp. 198-208. Aug. 2007.

Lee, et al., "Branch Prediction Strategies and Branch Target Buffer Design," Computer, Jan. 1984, 17 pages.

List of IBM Patents or Patent Applications Treated as Related, dated Feb. 24, 2016, 2 pages.

S. McFarling, "Combining Branch Predictors," WRL Technical Note TN-36, Digital Western Research Laboratory, Jun. 1993, 29 pages.

Tarjan et al., "Merging Path and Gshare Indexing in Perceptron Branch Prediction," ACM Transactions on Architecture and Code Optimization (TACO), vol. 2, No. 3, Sep. 2005, pp. 280-300.

U.S. Appl. No. 14/969,492, filed Dec. 15, 2015, Entitled: Auxiliary Branch Prediction With Usefulness Tracking, First Named Inventor: James J. Bonanno.

U.S. Appl. No. 14/969,535, filed Dec. 15, 2015, Entitled: Auxiliary Perceptron Branch Predictor With Magnitude Usage Limit, First Named Inventor: James J. Bonanno.

Yeh, et al., "Alternative implementations of two-level adaptive branch prediction," 19th Annual Symposium on Computer Architecture, May 1992, 11 pages.

List of IBM Patents or Patent Applications Treated as Related, dated Jul. 19, 2016, 2 pages.

U.S. Appl. No. 15/194,898, filed Jun. 28, 2016, Entitled: Perceptron Branch Predictor With Virtualized Weights, First Named Inventor: James J. Bonanno.

* cited by examiner

PERCEPTRON BRANCH PREDICTOR WITH VIRTUALIZED WEIGHTS

BACKGROUND

The present invention relates generally to computer processing systems, and more particularly to a perceptron branch predictor with virtualized weights in a processing system.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register. A throughput penalty is incurred if a branch is mispredicted.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

Perceptron branch predictors are simple artificial neural networks that predict a branch's direction by learning correlations between bits in a history vector and the branch outcome using a plurality of weights. This typically requires storing signed integer weights for each bit in the history vector. Perceptron branch predictors provide highly accurate predictions but are expensive in terms of silicon area required to store the weights and expensive in terms of area and cycle time to compute the prediction.

SUMMARY

According to one embodiment, a method is provided for virtualized weight perceptron branch prediction in a processing system. A selection is performed between two or more history values at different positions of a history vector based on a virtualization map value that maps a first selected history value to a first weight of a plurality of weights, where a number of history values in the history vector is greater than a number of the weights. The first selected history value is applied to the first weight in a perceptron branch predictor to determine a first modified virtualized weight. The first modified virtualized weight is summed with a plurality of modified virtualized weights to produce a prediction direction. The prediction direction is output as a branch predictor result to control instruction fetching in a processor of the processing system.

According to another embodiment, a branch predictor of a processing system includes a history vector, a plurality of weights, a virtualization map, and a perceptron branch predictor. The perceptron branch predictor is operable to select between two or more history values at different positions of the history vector based on a virtualization map value that maps a first selected history value to a first weight of the weights, where a number of history values in the history vector is greater than a number of the weights. The first selected history value is applied to the first weight in the perceptron branch predictor to determine a first modified virtualized weight. The first modified virtualized weight is summed with a plurality of modified virtualized weights to produce a prediction direction. The prediction direction is output as a branch predictor result to control instruction fetching in a processor of the processing system.

According to a further embodiment, a computer program product is provided for virtualized weight perceptron branch prediction in a processing system. The computer program product includes a computer readable storage medium having program instructions embodied therewith. The program instructions are executable by a processor to cause the processor to select between two or more history values at different positions of a history vector based on a virtualization map value that maps a first selected history value to a first weight of a plurality of weights, where a number of history values in the history vector is greater than a number of the weights. The first selected history value is applied to the first weight in a perceptron branch predictor to determine a first modified virtualized weight. The first modified virtualized weight is summed with a plurality of modified virtualized weights to produce a prediction direction. The prediction direction is output as a branch predictor result to control instruction fetching in the processor of the processing system.

DETAILED DESCRIPTION

Embodiments provide virtualized weight perceptron branch prediction. Weights in a perceptron branch predictor are summed, and the value of history bits from a history vector determines whether each weight is positive or negative. While perceptron branch predictors typically have a signed integer weight value per history bit, many of the weights may be close to zero and thus the value of a corresponding history bit has little to no effect on the resulting branch direction prediction. Embodiments store fewer weights than available history bits and map the most influential history bits to the weights. A periodic retraining process can be performed to identify weights that are at or near zero, and a mapping adjustment is performed to map the identified weights to different positions of the history vector to retrain the identified weights.

Figure 1:
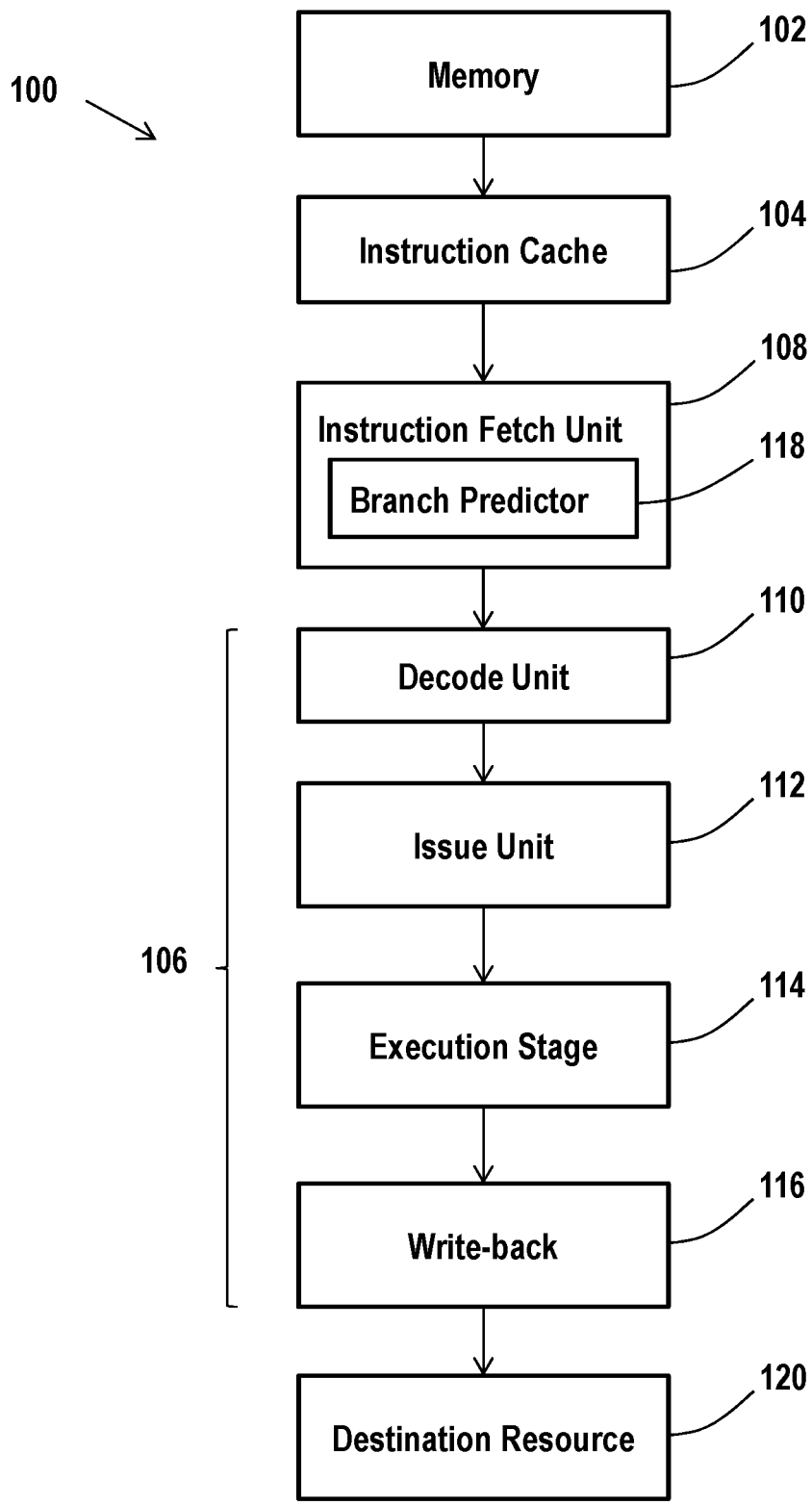
FIG. 1 illustrates a block diagram of a processing system in accordance with an embodiment.

FIG. 1 depicts a block diagram of a processing system 100 according to an embodiment. The processing system 100 includes a memory 102, an instruction cache 104, an instruction fetch unit 108, a branch predictor 118, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or non-volatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes the branch predictor 118. Alternatively, the branch predictor 118 may be located separately from the instruction fetch unit 108. The instruction fetch unit 108 can also include other branch prediction logic (not depicted). The branch predictor 118 is an example of a processing circuit to implement virtualized weight perceptron branch prediction.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
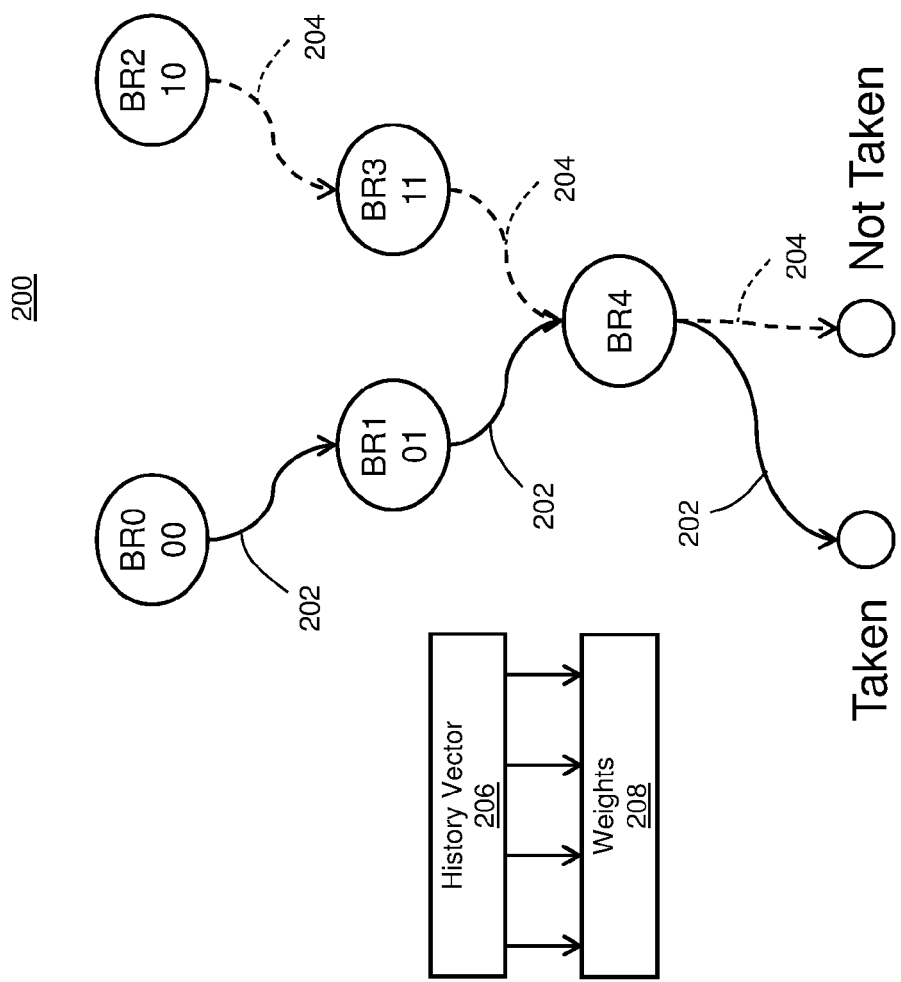
FIG. 2 depicts a perceptron branch prediction example.

FIG. 2 depicts a perceptron branch prediction example 200. In order to predict an outcome of a branch BR4 as taken or not taken, sequences of branches leading up to branch BR4 are observed and captured in a history vector 206. A branch taken sequence 202 for branch BR4 in this example includes branch BR0 to branch BR1 to branch BR4. A branch not-taken sequence 204 includes branch BR2 to branch BR3 to branch BR4. Branch BR0 can be encoded as '00' in history vector 206. Branch BR1 can be encoded as '01' in history vector 206. Branch BR2 can be encoded as '10' in history vector 206. Branch BR3 can be encoded as '11' in history vector 206. Therefore, branch taken sequence 202 may be stored in history vector 206 as '0001' when branches BR0 and BR1 are taken to reach branch BR4. Branch not-taken sequence 204 can be stored in history vector 206 as '1011' when branches BR2 and BR3 are encountered prior to reaching branch BR4. A perceptron branch predictor may train with weights 208 resulting in weight values of '−10', '0', '−10', and '0' with one bit of the history vector 206 mapped to one weight value in weights 208 (i.e., a 1-to-1 mapping). When the weights 208 are applied with the branch not taken sequence 204 of '1011' in the history vector 206, the sum is −10+0+−10+0=−20 (not taken). The weights 208 are inverted when bits of the history vector 206 are '0'. Therefore, when the weights 208 are applied with the branch taken sequence 202 of '0001' in the history vector 206, the sum is −1*−10+0+−1*−10+0=20 (taken). In either case, two of the weights 208 that have a value of zero in this example do not contribute to the sum. If the length of the history vector 206 is extended, the zero valued weights 208 may be remapped to consider impacts of one or more earlier branches prior to branches BR0 and BR2 to further increase prediction confidence. Alternatively, the number of weights 208 could be reduced. For example, if the number of weights 208 changed from four to two, the history vector 206 of four bits can be used, and a virtualization algorithm can learn the mapping so no weights of 0 would have been retained in storage.

Figure 3:
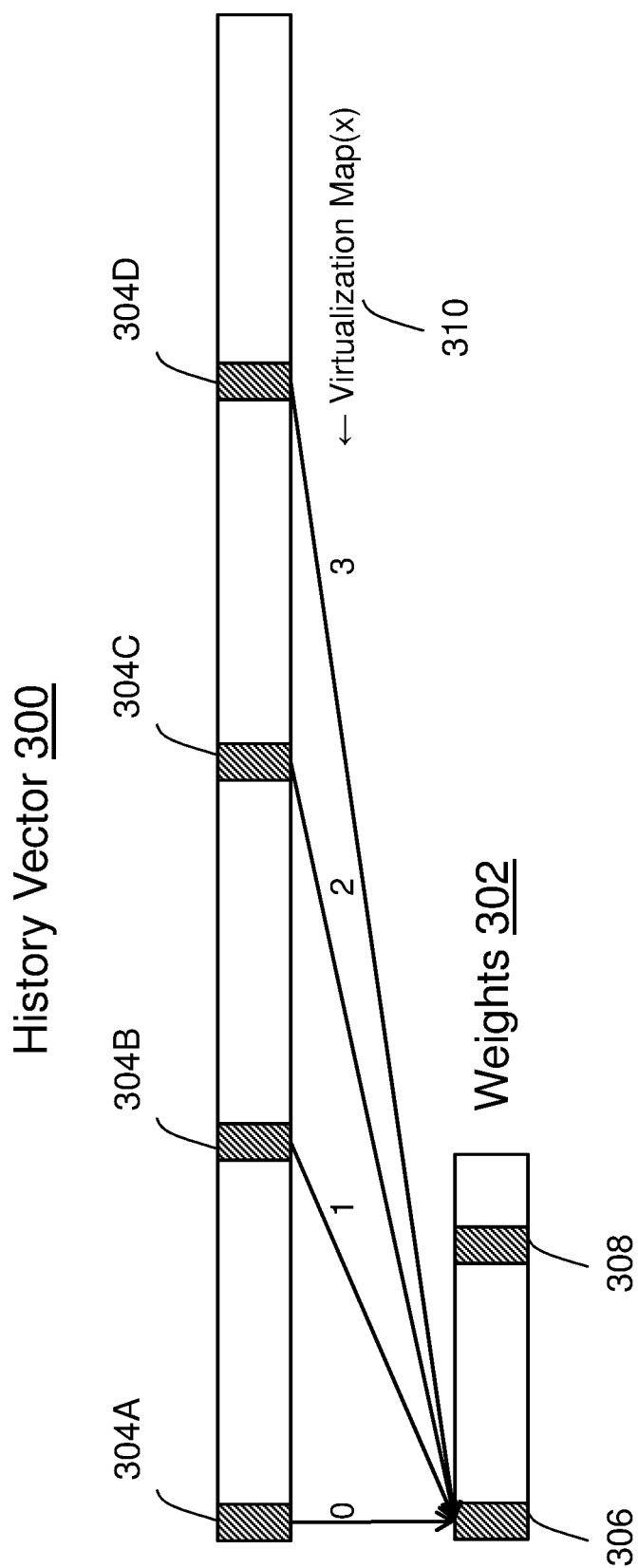
FIG. 3 depicts a virtualization mapping between a history vector and weights in accordance with an embodiment.

FIG. 3 depicts a virtualization mapping between a history vector 300 and weights 302 in accordance with an embodiment. The example of FIG. 3 depicts a four-to-one mapping of four history values 304A, 304B, 304C, and 304D at different positions of the history vector 300 possibly mapping to a first weight 306 of weights 302. A virtualization map value of a virtualization map 310 can be set to select which of the history values 304A-304D is mapped to the first weight 306. The virtualization map 310 can also select different positions in the history vector 300 to map with other locations in the weights 302. For example, one or more of the history values 304A-304D can be selected as mapping to a second weight 308 of the weights 302, where a different one of the history values 304A-304D is mapped to the first weight 306, e.g., history value 304A mapped to first weight 306 and history value 304C mapped to second weight 308. The mappings need not overlap, for instance, the second weight 308 may be mapped to other positions in the history vector 300 such that the history values 304A-304D cannot be mapped to the second weight 308. Although the example of FIG. 3 depicts four times the number of history values in the history vector 300 as compared to the number of weights 302, many ratios are contemplated. In embodiments, the number of history values in the history vector 300 is greater than the number of the weights 302.

Figure 4:
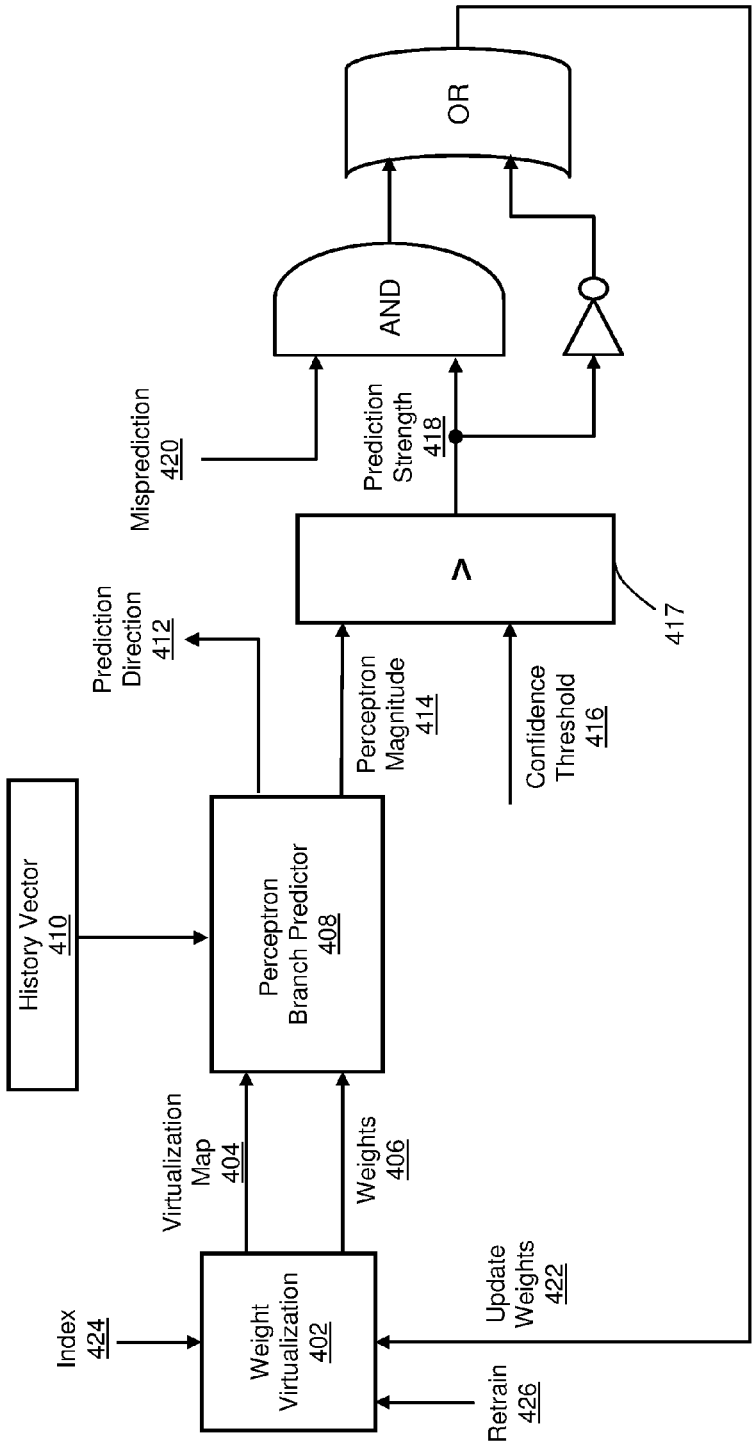
FIG. 4 depicts a branch predictor in accordance with an embodiment.

FIG. 4 depicts a portion of the branch predictor 118 of FIG. 1 in accordance with an embodiment. In the example of FIG. 4, weight virtualization 402 can provide a virtualization map 404 and weights 406 to a perceptron branch predictor 408. The perceptron branch predictor 408 also receives a history vector 410. The history vector 410 may be a taken branch global history rather than a direction history. For example, when implemented as a taken branch global history, the history vector 410 may be shared with other branch prediction structures such as one or more pattern history tables. The perceptron branch predictor 408 outputs a prediction direction 412 as a branch predictor result to control instruction fetching in a processor of the processing system 100 of FIG. 1. For example, the prediction direction 412 can be provided to the instruction fetch unit 108 of FIG. 1 to fetch instructions prior to the processing pipeline 106 determining whether a branch instruction resolved to taken or not-taken. The prediction direction 412 may also be combined with other branch predictor results (e.g., branch target buffer results, branch history results, branch pattern history table results, and the like) to assist in making a final prediction.

A perceptron magnitude 414 determined by perceptron branch predictor 408 can be used to measure confidence in the prediction by comparing it against a confidence threshold 416, for instance, using a comparator block 417. Above the confidence threshold 416, prediction strength 418 is considered strong and below the confidence threshold 416, the prediction strength 418 is considered weak. The branch predictor 118 can be notified of a wrong prediction as a misprediction 420 when the processing pipeline 106 of FIG. 1 resolves an actual target of a branch instruction. Wrong predictions have their weights updated during training for correction, while weak (but correct) predictions have their weights updated for strengthening. The weight virtualization 402 can be triggered to perform an update weights 422 operation to update values of the weights 406 based on determining that the perceptron magnitude 414 is less than the confidence threshold 416 or the perceptron magnitude 414 is greater than the confidence threshold 416 and a misprediction 420 is detected.

Each branch prediction address tracked by the branch predictor 118 has an associated set of the virtualization map 404 and weights 406. When a branch prediction is requested, a branch instruction address can be used as an index 424 into the weight virtualization 402 to select a corresponding set of the virtualization map 404 and weights 406 for use by the perceptron branch predictor 408 to produce a branch predictor result. Training of the weights 406 can be performed by incrementing or decrementing the weights 406 based on branch outcomes during program execution. Periodically after training, for each of the weights 406 that are at or below a retraining threshold (e.g., at or near zero), a retraining request 426 can be provided to the weight virtualization 402 to adjust the virtualization mapping and select a different position in the history vector 410. Each of the weights 406 that are at or below the retraining threshold can be reset to zero as part of the remapping to learn new weight values. This enables a longer history to be effectively used by mapping only relevant values of the history vector 410 to weights 406.

Figure 5:
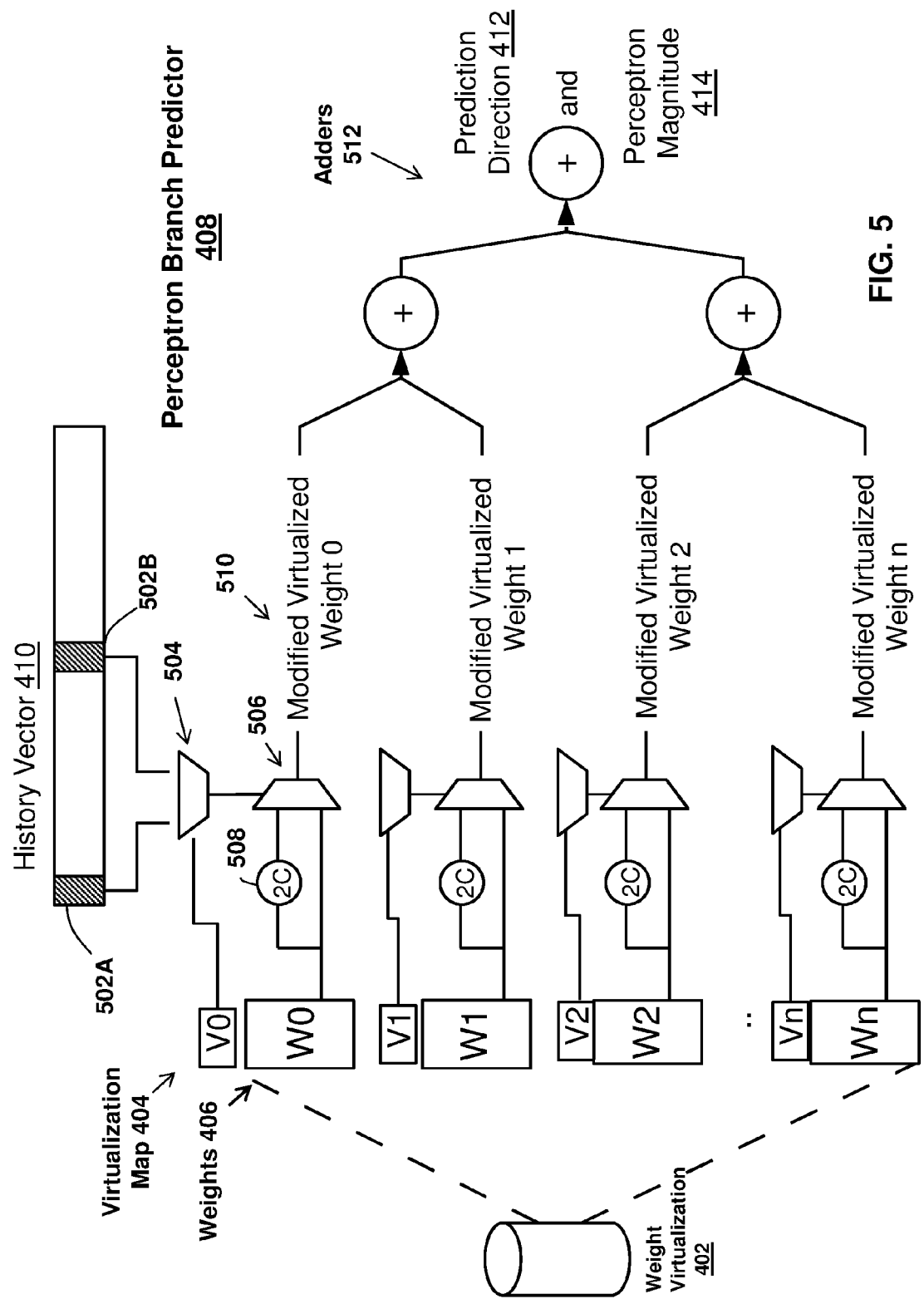
FIG. 5 depicts a perceptron branch predictor using virtualized weights in accordance with an embodiment.

FIG. 5 depicts a block diagram of the perceptron branch predictor 408 of FIG. 4 in accordance with an embodiment. In the example of FIG. 5, a virtualization mapping value V0 of virtualization map 404 enables selection between two history values 502A and 502B at different positions of the history vector 410 to be applied to a first weight W0 of weights 406. Similarly, virtualization mapping values V1-Vn of virtualization map 404 enables selection between a pair of history values at different positions in the history vector 410 to apply to corresponding instances of weights W1-Wn of weights 406. The instances of the virtualization mapping values V0-Vn and values of weights W0-Wn are separately maintained for each branch instruction prediction, while the history vector 410 can be globally applied across multiple branch instruction predictions.

In the example of FIG. 5, the selection between different positions in the history vector 410 is performed using multiplexers 504, where each selected history value is used as input to respective multiplexers 506 to select between weights 406 and a corresponding twos-complement 508 (i.e., negative version) of the same weight 406, such as W0 and −W0. Modified virtualized weights 510 are computed based on the weights 406 and values of the history vector 410 selected by the virtualization map 404. For example, if virtualization mapping value V0 is set to zero and history value 502A (i.e., the first selected history value) is set to zero, then modified virtualized weight0 would be set to −W0; however, if history value 502A is a one, then modified virtualized weight0 would be set to W0. If virtualization mapping value V0 is set to one, then history value 502B would be used to select between −W0 and W0. This computation can be performed in parallel for all modified virtualized weights0-n. The modified virtualized weights 510 are summed, for instance using adders 512, to produce prediction direction 412 and perceptron magnitude 414. The prediction direction 412 is the sign of the summation result, and the perceptron magnitude 414 is a confidence level. A positive sign in the prediction direction 412 may be considered predicted taken as a branch predictor result. A negative sign may be considered predicted not-taken in the branch predictor result.

The adders 512 can be efficiently implemented to reduce delays by incorporating information needed for various decisions into the adders 512. For instance, the equivalent of twos-complement 508 operations and selection by multiplexers 506 can be incorporated into the adders 512. Further, the comparison of the perceptron magnitude 414 and the confidence threshold 416 depicted as comparator block 417 of FIG. 4 can be incorporated into the adders 512 as further described herein.

Figure 6:
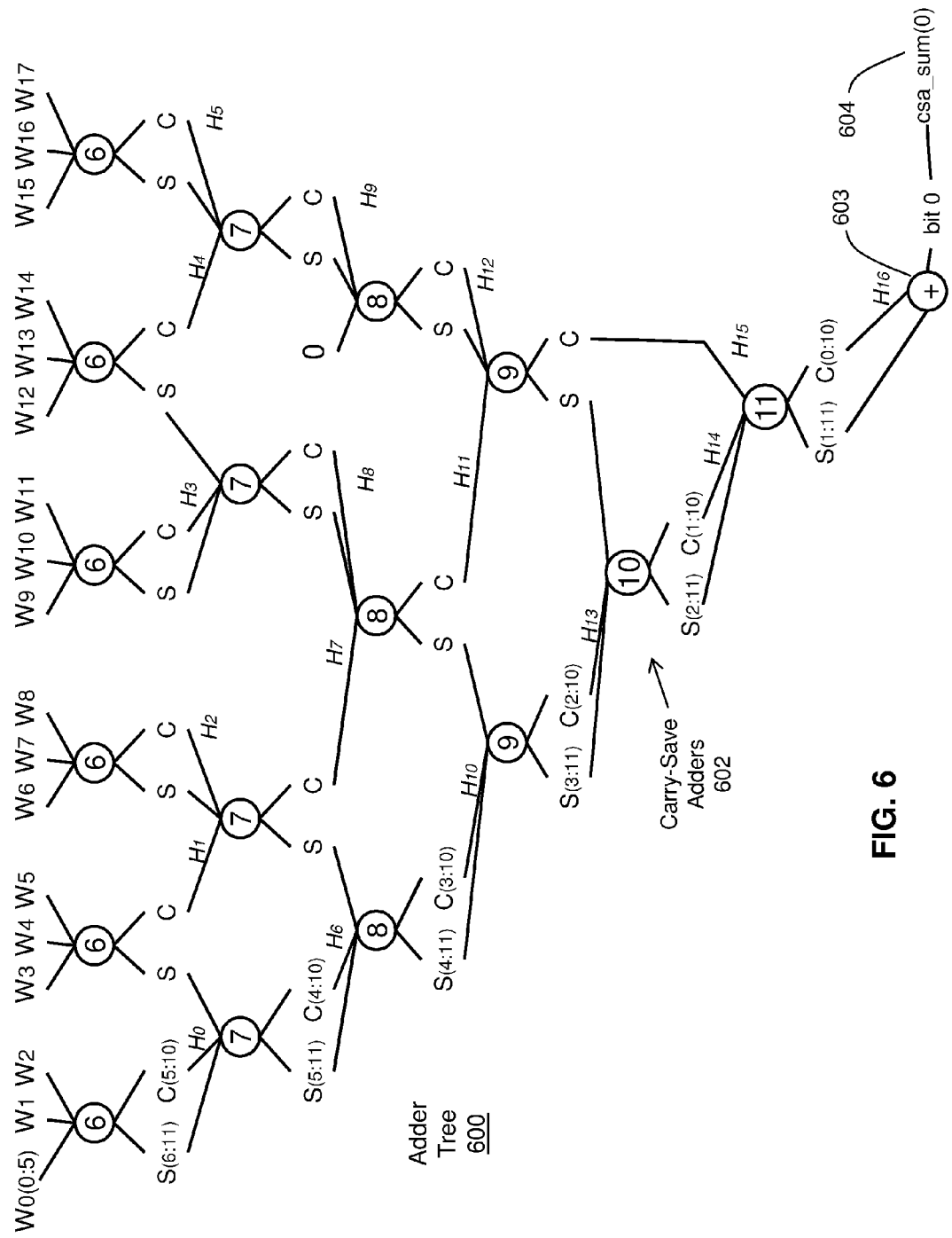
FIG. 6 depicts an adder tree in accordance with an embodiment.

FIG. 6 depicts an adder tree 600 in accordance with an embodiment. The adder tree 600 can be used to implement the adders 512 of FIG. 5. The adder tree 600 implements a tree of carry-save adders (CSAs) 602 to sum the modified virtualized weights of N-bit width, with only one full adder 603 at the end to produce a final sum bit 604. Each CSA 602 input takes three modified virtualized weights (W) of width (1 to n) bits each and outputs a sum (1 to n) and carry (0 to n−1). The example of FIG. 6 adds 18 6-bit modified virtualized weights (including a bias weight that is uncorrelated to history) with 17 selected history values (H bits) using progressively wider CSAs 602 (e.g., ranging from 6-bits wide to 11-bits wide). The twos-complement operation 508 on the weights 406 (applied when a selected history value is zero) of FIG. 6 can be split into inversion and increment components. The twos-complement operation 508 is split so that the twos-complement operation 508 becomes an inversion and the plus one (increment) happens within the adder tree 600. The increment can be included in the spaces in the adder tree 600 where the carry output is shifted left to become the next levels' CSA 602 input. As such, the twos-complement 508 operation can be efficiently implemented, and the adder tree 600 effectively accumulates the modified virtualized weights 510 of FIG. 5 by summing the weights 406 and all selected history values of the history vector 410 of FIG. 5.

Figure 7:
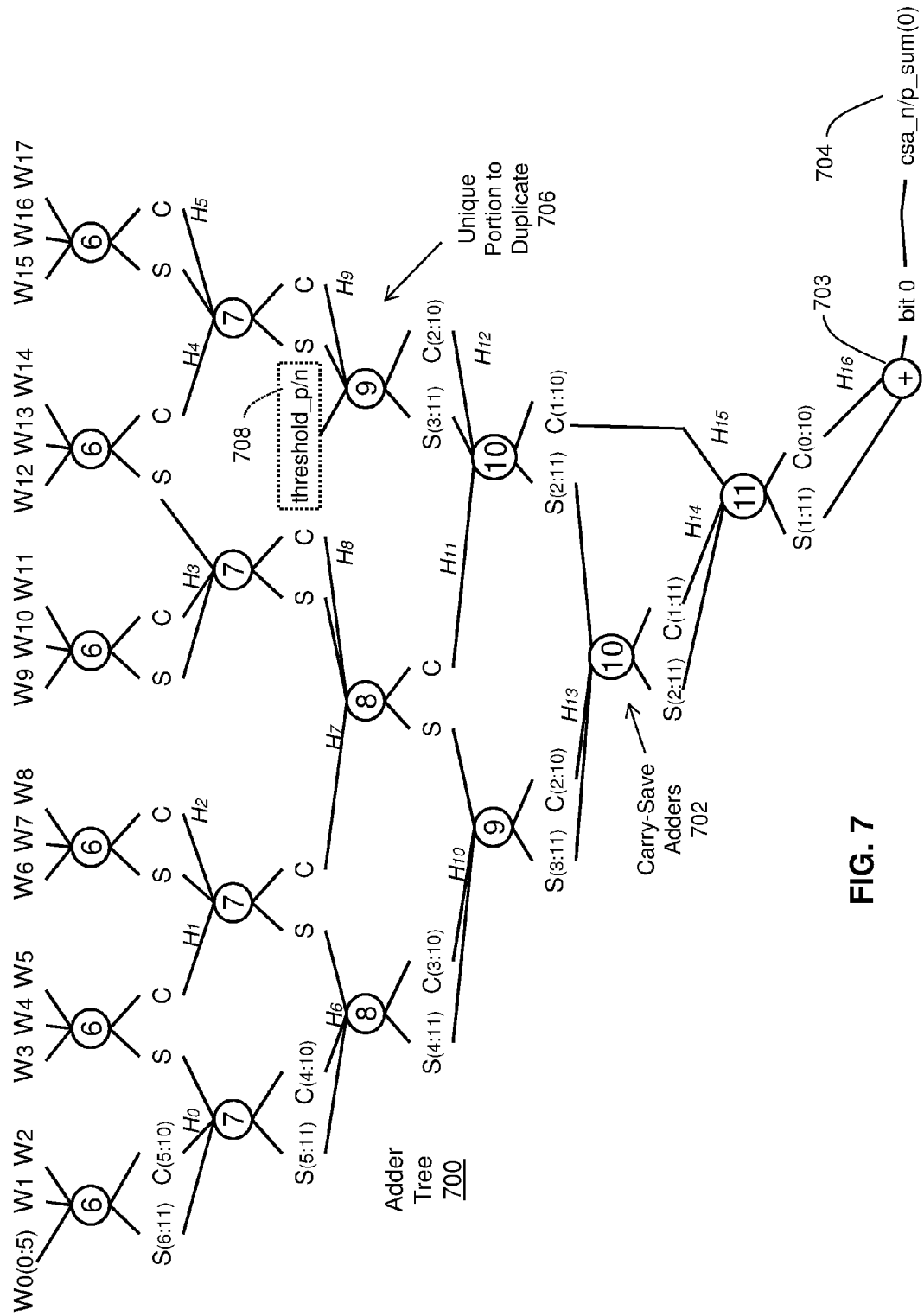
FIG. 7 depicts an adder tree with a threshold determination in accordance with an embodiment.

FIG. 7 depicts an adder tree 700 with a threshold determination in accordance with an embodiment. The adder tree 700 can be used to implement the adders 512 of FIG. 5 according to an embodiment. Similar to the adder tree 600 of FIG. 6, the adder tree 700 implements a tree of CSAs 702 to sum the modified virtualized weights of N-bit width, with only one full adder 703 at the end to produce a final sum bit 704. The threshold comparison of comparator 417 of FIG. 4 is folded into the adder tree 700 by including a positive and negative instance of the threshold value (confidence threshold 416) at 708 and duplicating a unique portion 706 of the adder tree 700 below 708 to create first and second comparison result branches. The final sum bit 604 from the adder tree 600 of FIG. 6 can be used to determine whether to select the first comparison result branch (e.g., adding a positive threshold) or the second comparison result branch (e.g., adding a negative threshold) as a result of the comparison of the perceptron magnitude to the confidence threshold. The final sum bit 604 of FIG. 6 is a multiplexer selector between final sum bit 704 as csa_n_sum(0) or csa_p_sum(0). If it is assumed that the final sum will be positive, upon adding in a negative threshold value, if the result stays positive then the conclusion is that the original sum was greater than the threshold (i.e., perceptron magnitude 414>confidence threshold 416). Similarly, when adding a positive threshold, if the result remains negative, then the magnitude of the prediction was greater than the threshold (i.e., perceptron magnitude 414>confidence threshold 416).

Figure 8:
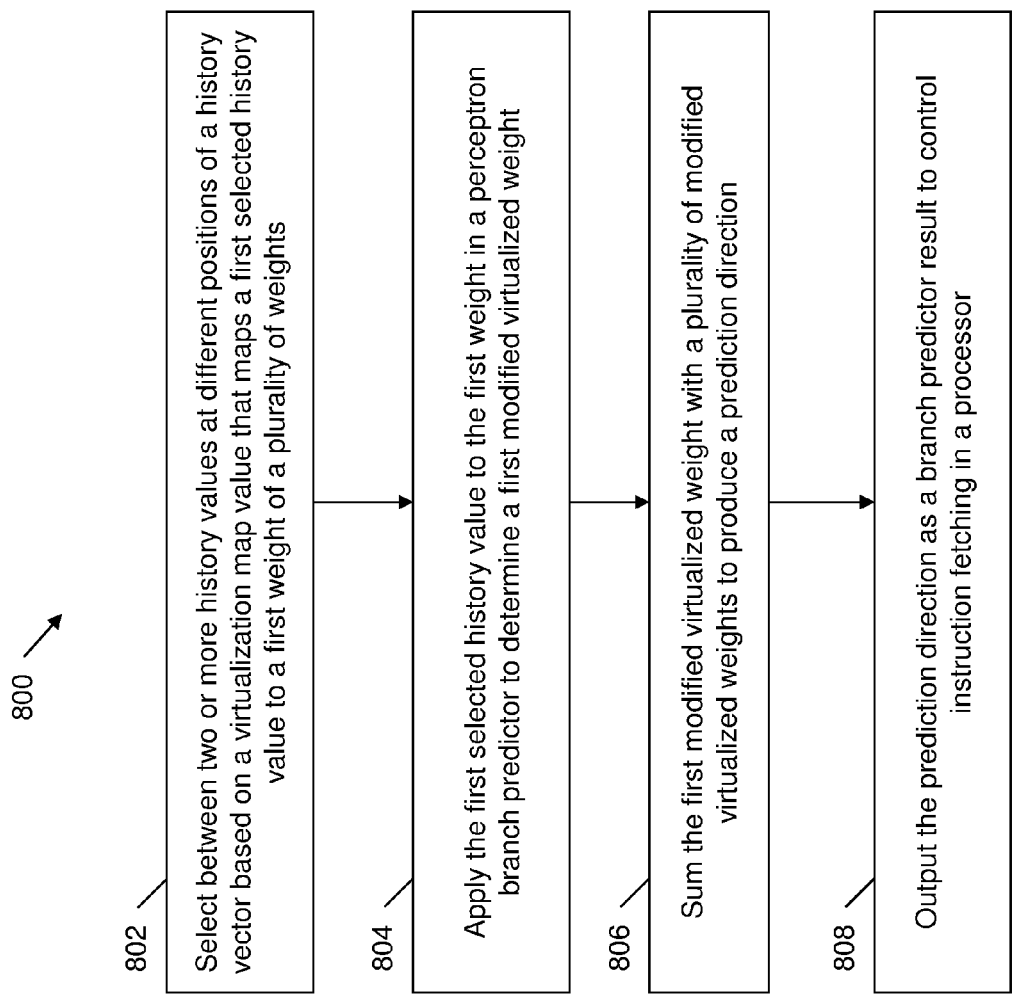
FIG. 8 is a process flow diagram for virtualized weight perceptron branch prediction in accordance with an embodiment.

FIG. 8 depicts a high-level process flow diagram for virtualized weight perceptron branch prediction in a processing system in accordance with an embodiment. Process 800 of FIG. 8 is a method that can be performed by the branch predictor 118 of FIGS. 1 and 4. For ease of explanation, process 800 is described in reference to the branch predictor 118 of the processing system 100 of FIG. 1 and in further reference to FIGS. 4-7.

At block 802, perceptron branch predictor 408 selects between two or more history values 502 at different positions of history vector 410 based on a virtualization map value V0 that maps a first selected history value (e.g., history value 502A) to a first weight W0 of a plurality of weights 406, where the number of history values 502 in the history vector 410 is greater than the number of the weights 406. The history vector 410 may be a taken branch global history. At block 804, the perceptron branch predictor 408 applies the first selected history value to the first weight W0 to determine a first modified virtualized weight0.

At block 806, the perceptron branch predictor 408 sums the first modified virtualized weight0 with a plurality of modified virtualized weights(1 to n) to produce a prediction direction 412. Summing the first modified virtualized weight0 with the plurality of modified virtualized weights(1 to n) also produces a perceptron magnitude 414. Summing the first modified virtualized weight0 with the plurality of modified virtualized weights(1 to n) may be performed by using an adder tree, such as adder tree 600 or 700, that includes a plurality of carry-save adders 602, 702 to accumulate the modified virtualized weights 510 by summing the weights 406 and all selected history values of the history vector 410. The confidence threshold 416 can be added in empty spots (e.g., at 708) in the adder tree 700 to perform a comparison of the perceptron magnitude 414 to the confidence threshold 416. Adding the confidence threshold 416 in empty spots in the adder tree 700 can include duplicating unique portions 706 of the adder tree 700 to include a positive instance of the confidence threshold 316 (e.g., at 708) on a first comparison result branch of the adder tree 700 and a negative instance of the confidence threshold 416 on a second comparison result branch of the adder tree 700. The sign of a final weight in the adder tree 700 can determine whether to select the first comparison result branch or the second comparison result branch as a result of the comparison of the perceptron magnitude 414 to the confidence threshold 416.

At block 808, the perceptron branch predictor 408 outputs the prediction direction 412 as a branch predictor result to control instruction fetching in a processor of the processing system 100.

Values of the weights 406 can be updated based on determining that the perceptron magnitude 414 is less than a confidence threshold 416 or the perceptron magnitude 414 is greater than the confidence threshold 416 and a misprediction 420 is detected. Further, periodic comparing of the weights to a retraining threshold can be performed. A virtualization mapping may be adjusted to select a different position in the history vector 410 for each of the weights 406 that are at or below the retraining threshold. Each of the weights 406 that are at or below the retraining threshold can be reset to zero. For example, the virtualization map value V0 can be adjusted (e.g., changed from 0 to 1) to map a second selected history value 502B of the history vector 410 to the first weight W0 based on determining that the first weight W0 is at or below a retraining threshold after an initial training period has elapsed with the first selected history value 502A.

Figure 9:
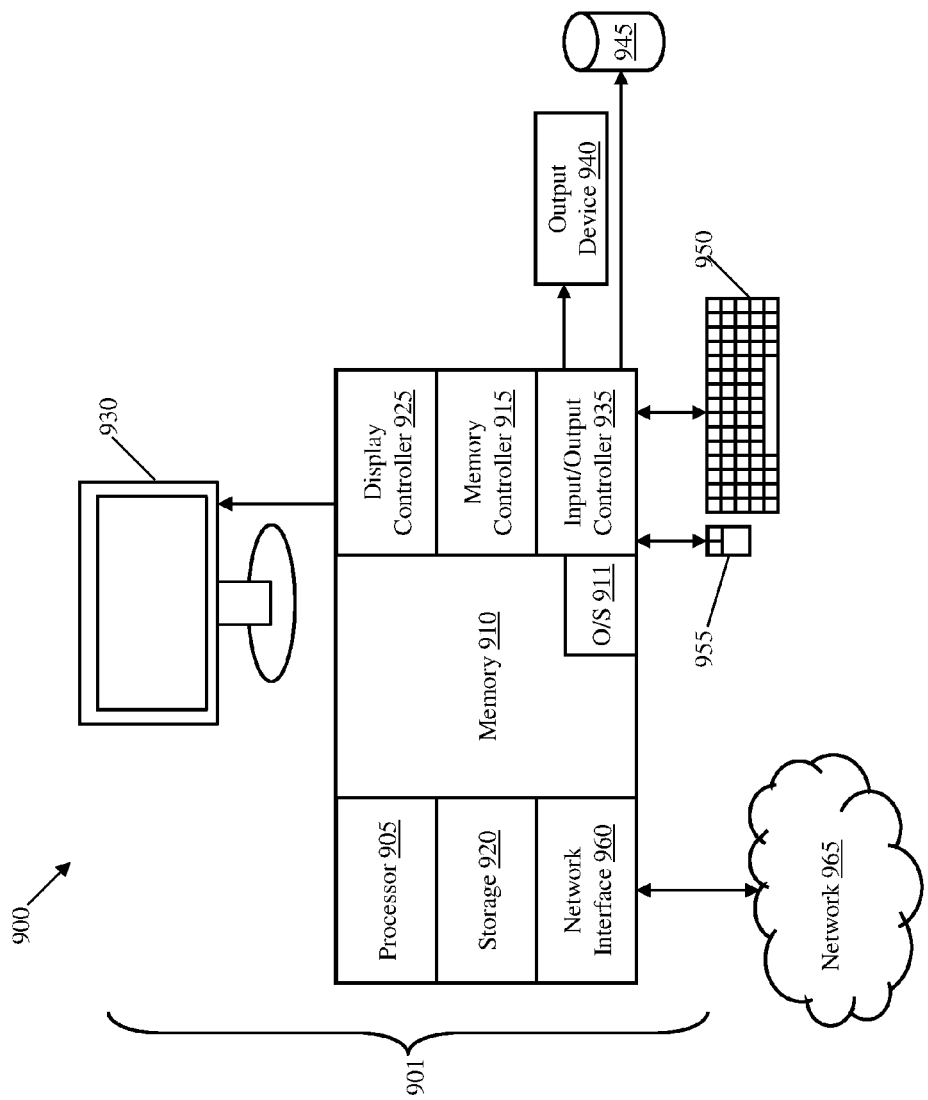
FIG. 9 is a computing system according to an embodiment.

FIG. 9 depicts a block diagram of a system 900 for virtualized weight perceptron branch prediction in a processor 905. The methods described herein can be implemented in hardware, software (e.g., firmware), or a combination thereof. In an exemplary embodiment, the methods described herein are implemented in hardware as part of the microprocessor of a computer, such as a personal computer, workstation, minicomputer, or mainframe computer. The system 900 therefore includes computer 901 as illustrated in FIG. 9.

In an exemplary embodiment, in terms of hardware architecture, as shown in FIG. 9, the computer 901 includes a processor 905 which is a processing circuit that includes the processing pipeline 106 of FIG. 1 and branch predictor 118. The computer 901 further includes memory 910 coupled to a memory controller 915, and one or more input and/or output (I/O) devices 940, 945 (or peripherals) that are communicatively coupled via a local input/output controller 935. The input/output controller 935 can be, for example but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in storage 920, such as cache storage, or memory 910. The processor 905 can be any custom made or commercially available processor, a central processing unit (CPU), an auxiliary processor among several processors associated with the computer 901, a semiconductor based microprocessor (in the form of a microchip or chip set), a macroprocessor, or generally any device for executing instructions.

The memory 910 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, and/or other types of storage media. Note that the memory 910 can have a distributed architecture, where various components are situated remote from one another, but can be accessed by the processor 905.

The instructions in memory 910 may include one or more separate programs, each of which comprises an ordered listing of executable instructions for implementing logical functions. In the example of FIG. 9, the instructions in the memory 910 a suitable operating system (OS) 911. The operating system 911 essentially controls the execution of other computer programs and provides scheduling, input-output control, file and data management, memory management, and communication control and related services.

In an exemplary embodiment, a conventional keyboard 950 and mouse 955 can be coupled to the input/output controller 935. Other output devices such as the I/O devices 940, 945 may include input devices, for example but not limited to a printer, a scanner, microphone, and the like. Finally, the I/O devices 940, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 900 can further include a display controller 925 coupled to a display 930. In an exemplary embodiment, the system 900 can further include a network interface 960 for coupling to a network 965. The network 965 can be an IP-based network for communication between the computer 901 and any external server, client and the like via a broadband connection. The network 965 transmits and receives data between the computer 901 and external systems. In an exemplary embodiment, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 901 is a PC, workstation, intelligent device or the like, the instructions in the memory 910 may further include a basic input output system (BIOS) (omitted for simplicity). The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to fetch and execute instructions stored within the memory 910, to communicate data to and from the memory 910, and to generally control operations of the computer 901 pursuant to the instructions.

In an exemplary embodiment, where the branch predictor 118 of FIG. 2 is implemented in hardware, the methods described herein, such as process 800 of FIG. 8, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include achieving increased branch prediction accuracy by extending an effective length of a history vector without adding corresponding weights via virtualization mapping. Embodiments can further increase processing efficiency by incorporating virtualized weights and selected history bits in an adder tree. Additional efficiency can be achieved by incorporating a confidence threshold into the adder tree.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for virtualized weight perceptron branch prediction in a processing system, the method comprising:
    selecting between two or more history values at different positions of a history vector based on a virtualization map value that maps a first selected history value to a first weight of a plurality of weights, wherein a number of history values in the history vector is greater than a number of the weights;
    applying the first selected history value to the first weight in a perceptron branch predictor to determine a first modified virtualized weight;
    summing the first modified virtualized weight with a plurality of modified virtualized weights to produce a prediction direction and a perceptron magnitude by:
        updating values of the weights based on determining that the perceptron magnitude is less than a confidence threshold or the perceptron magnitude is greater than the confidence threshold and a misprediction is detected;

using an adder tree comprising a plurality of carry-save adders to accumulate the modified virtualized weights by summing the weights and all selected history values of the history vector; and adding the confidence threshold in empty spots in the adder tree to perform a comparison of the perceptron magnitude to the confidence threshold, wherein adding the confidence threshold in empty spots in the adder tree further comprises duplicating unique portions of the adder tree to include a positive instance of the confidence threshold on a first comparison result branch of the adder tree and a negative instance of the confidence threshold on a second comparison result branch of the adder tree, and a sign of a final weight in the adder tree determines whether to select the first comparison result branch or the second comparison result branch as a result of the comparison of the perceptron magnitude to the confidence threshold; and outputting the prediction direction as a branch predictor result to control instruction fetching in a processor of the processing system.

2. The method of claim 1, further comprising:

adjusting the virtualization map value to map a second selected history value of the history vector to the first weight based on determining that the first weight is at or below a retraining threshold after an initial training period has elapsed.

3. The method of claim 1, further comprising:

periodically comparing the weights to a retraining threshold;

adjusting a virtualization mapping to select a different position in the history vector for each of the weights that are at or below the retraining threshold; and resetting each of the weights that are at or below the retraining threshold to zero.

4. The method of claim 1, wherein the history vector comprises a taken branch global history.

5. A branch predictor of a processing system, the branch predictor comprising:

a history vector;

a plurality of weights;

a virtualization map; and a perceptron branch predictor operable to perform:

selecting between two or more history values at different positions of the history vector based on a virtualization map value that maps a first selected history value to a first weight of the weights, wherein a number of history values in the history vector is greater than a number of the weights;

applying the first selected history value to the first weight in the perceptron branch predictor to determine a first modified virtualized weight;

summing the first modified virtualized weight with a plurality of modified virtualized weights to produce a prediction direction and a perceptron magnitude by:

updating values of the weights based on determining that the perceptron magnitude is less than a confidence threshold or the perceptron magnitude is greater than the confidence threshold and a misprediction is detected;

using an adder tree comprising a plurality of carry-save adders to accumulate the modified virtualized weights by summing the weights and all selected history values of the history vector; and adding the confidence threshold in empty spots in the adder tree to perform a comparison of the perceptron magnitude to the confidence threshold, wherein adding the confidence threshold in empty spots in the adder tree further comprises duplicating unique portions of the adder tree to include a positive instance of the confidence threshold on a first comparison result branch of the adder tree and a negative instance of the confidence threshold on a second comparison result branch of the adder tree, and a sign of a final weight in the adder tree determines whether to select the first comparison result branch or the second comparison result branch as a result of the comparison of the perceptron magnitude to the confidence threshold; and outputting the prediction direction as a branch predictor result to control instruction fetching in a processor of the processing system.

6. The branch predictor of claim 5, wherein the perceptron branch predictor is further operable to perform:

adjusting the virtualization map value to map a second selected history value of the history vector to the first weight based on determining that the first weight is at or below a retraining threshold after an initial training period has elapsed.

7. The branch predictor of claim 5, wherein the perceptron branch predictor is further operable to perform:

periodically comparing the weights to a retraining threshold;

adjusting a virtualization mapping to select a different position in the history vector for each of the weights that are at or below the retraining threshold; and resetting each of the weights that are at or below the retraining threshold to zero.

8. The branch predictor of claim 5, wherein the history vector comprises a taken branch global history.

9. A computer program product for virtualized weight perceptron branch prediction in a processing system comprising a computer readable storage medium having program instructions embodied therewith, the program instructions executable by a processor to cause the processor to:

select between two or more history values at different positions of a history vector based on a virtualization map value that maps a first selected history value to a first weight of a plurality of weights, wherein a number of history values in the history vector is greater than a number of the weights;

apply the first selected history value to the first weight in a perceptron branch predictor to determine a first modified virtualized weight;

sum the first modified virtualized weight with a plurality of modified virtualized weights to produce a prediction direction and a perceptron magnitude by:

updating values of the weights based on determining that the perceptron magnitude is less than a confidence threshold or the perceptron magnitude is greater than the confidence threshold and a misprediction is detected;

using an adder tree comprising a plurality of carry-save adders to accumulate the modified virtualized weights by summing the weights and all selected history values of the history vector; and adding the confidence threshold in empty spots in the adder tree to perform a comparison of the perceptron magnitude to the confidence threshold, wherein adding the confidence threshold in empty spots in the adder tree further comprises duplicating unique portions of the adder tree to include a positive instance of the confidence threshold on a first comparison result branch of the adder tree and a negative instance of the confidence threshold on a second comparison result branch of the adder tree, and a sign of a final weight in the adder tree determines whether to select the first comparison result branch or the second comparison result branch as a result of the comparison of the perceptron magnitude to the confidence threshold; and output the prediction direction as a branch predictor result to control instruction fetching in the processor of the processing system.

10. The computer program product of claim 9, wherein the program instructions executable by the processor further cause the processor to:

adjust the virtualization map value to map a second selected history value of the history vector to the first weight based on determining that the first weight is at or below a retraining threshold after an initial training period has elapsed.

11. The computer program product of claim 9, wherein the program instructions executable by the processor further cause the processor to:

periodically compare the weights to a retraining threshold;

adjust a virtualization mapping to select a different position in the history vector for each of the weights that are at or below the retraining threshold; and reset each of the weights that are at or below the retraining threshold to zero.

* * * * *